(12) United States Patent
Briancon

(10) Patent No.: US 6,266,513 B1
(45) Date of Patent: *Jul. 24, 2001

(54) APPARATUS AND METHOD FOR MISSING MESSAGE RECONCILIATION

(75) Inventor: Alain Charles Briancon, Southlake, TX (US)

(73) Assignee: Motorola, Inc., Schaumburg, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/961,877

(22) Filed: Oct. 31, 1997

(51) Int. Cl.[7] ..................................................... H04B 7/26
(52) U.S. Cl. ........................ 455/31.3; 455/38.1; 455/517
(58) Field of Search .................................. 455/422, 38.1, 455/38.4, 434, 458, 507, 517, 524, 59, 31.2, 31.3; 340/825.44

(56) References Cited

U.S. PATENT DOCUMENTS 5,590,403 * 12/1996 Cameron et al. .................... 455/517

* cited by examiner

Primary Examiner—Thanh Cong Le
(74) Attorney, Agent, or Firm—R. Louis Breeden

(57) ABSTRACT

Methods of and corresponding apparatus for missing message reconciliation of messages initially sent over a wireless operating channel (123) in a selective messaging system (100) for a messaging unit (135) include receiving messages (305), and processing the message to provide an identifier corresponding to the message (307), prior to, transmitting, using local resources (145) and an internet based pathway (110), a reconciliation message back to the message source (105) within the selective messaging system. Analogously at the selective messaging system a method includes the steps of; scheduling a message including a message sequence number (MSN) (405), receiving a reconciliation message from the local resource (407) originating at the selective messaging unit (MSN), and re-transmitting the portion of the message with MSN using local resources (413) or wireless operating channel (417).

32 Claims, 4 Drawing Sheets

APPARATUS AND METHOD FOR MISSING MESSAGE RECONCILIATION

FIELD OF THE INVENTION

This invention relates generally to communication systems and more specifically but not limited to methods and corresponding apparatus for missing message reconciliation in a messaging system.

BACKGROUND OF THE INVENTION

Communications systems, and specifically messaging and paging systems, are arranged to reliably deliver information as long as the selective messaging unit (SMU) is within coverage range of the infrastructure. However, it may be economically impractical to deploy messaging and paging systems, either initially or during expansion, that completely guarantee coverage for a SMU anywhere within the system. Anytime that coverage is lacking or marginal a user or SMU may miss or fail to receive a message. Often the user will not realize they have missed a message. Some messaging and paging units, two way and one way units, will notify, using a visual status indication, the user of range or coverage status, thus providing some notice of potential missed messages. However this still requires the user to monitor the status indication and this may be overly burdensome particularly in unfamiliar areas. The potential or actual loss of messages is clearly a problem or significant inconvenience for subscribers that need messaging or paging coverage.

Those inconveniences or concerns spawned the concept of a message sequence number corresponding to each message for a given subscriber or SMU. The message sequence number allowed the selective messaging unit to track the messages received from the selective messaging system and to display this information for the subscriber. A message sequence number (MSN) is selected by the infrastructure or selective messaging system from a predetermined, usually sequential, numbering scheme. Subscribers by observation note the message sequence numbers successfully received, thus those that are not received and contact the service provider for a re-transmission of those that have not been successfully received.

Issues arise when the selective messaging unit is still out of range when re-transmission is requested as the system inefficiently uses airtime by attempting to re-send messages and of course the message is still not received. Additionally any utility depends on the subscriber noting irregularities in the sequence of message sequence numbers.

Two way selective messaging units have the ability to communicate with the infrastructure and can be arranged to recognize is certain irregularities in the message sequence number. Thus many of the problems that result from reliance on subscriber observation can be effectively dealt with by two-way units. However, message reconciliation problems that arise due to continuing lack of coverage, such as often found inside buildings, are not presently satisfactorily handled by either one-way or two way selective messaging units and systems.

Clearly a need exists for more effective missing message reconciliation.

BRIEF DESCRIPTION OF THE DRAWINGS

The features of the present invention that are believed to be novel are set forth with particularity in the appended claims. However, the invention together with further advantages thereof, may best be understood by reference to the accompanying drawings wherein:

DETAILED DESCRIPTION OF A PREFERRED EMBODIMENT

Figure 1:
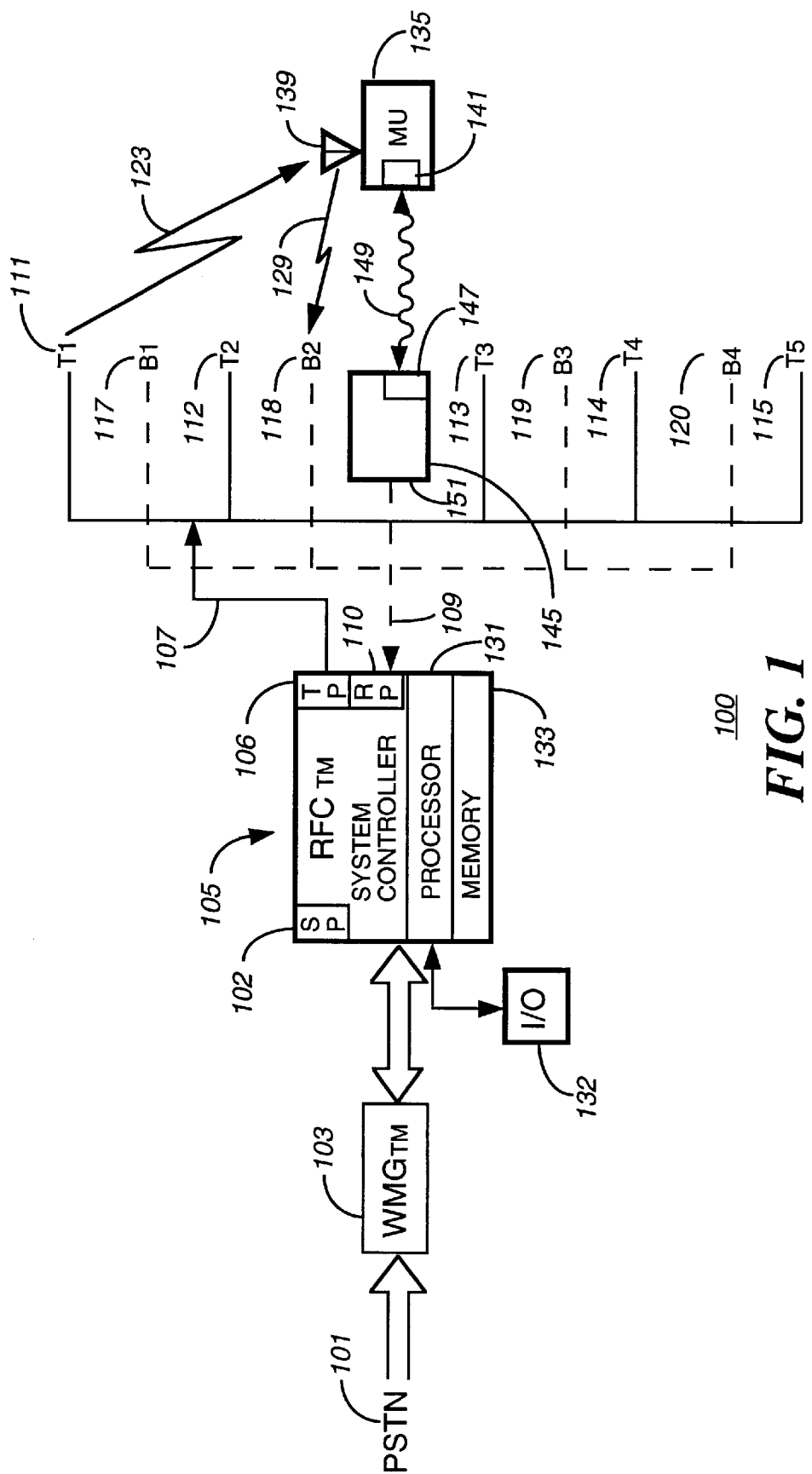
FIG. 1 is a block diagram of a selective messaging system suitable for employing message reconciliation in accordance with the instant invention.

The present disclosure concerns communications systems, such as selective messaging systems that are arranged to provide efficient message reconciliation. In a preferred embodiment, set in a selective messaging unit (SMU), a method of message reconciliation includes receiving messages initiated by a wireless messaging system; processing the messages to provide an identifier, such as a messaging sequence number, corresponding to the message; and transmitting, using local resources, a reconciliation message, including the identifier, to a message source such as a controller or terminal.

Preferably the method of transmitting further includes transmitting using an infrared transceiver and utilizing an internet based pathway for coupling the infrared transceiver to the message source. The method can also be implemented by transmitting with a local area network transceiver, such as a radio frequency transceiver operable in the industrial, scientific, and medical (ISM) bands at 2.4 Ghz as a local or home area network, and utilizing an internet based pathway for coupling the local area network transceiver to the message source. Another embodiment includes transmitting with an optical transceiver and utilizing an internet based pathway for coupling the optical transceiver to the message source. The method of transmitting further includes providing a content indication or priority indication corresponding to the message and conditioning the transmission on the content indication. Preferably, the method further includes a step of receiving a response to the reconciliation message; the response including the message corresponding to the identifier, from the messages source using the local resources. Alternatively, the selective messaging unit receives a response to the reconciliation message from the message source using the wireless messaging system normal wireless operating channel.

An alternative embodiment is set in a selective messaging system and is a method of reconciling messages delivered over a wireless operating channel for a selective messaging unit. The method includes scheduling a message including an identifier, such as a message sequence number, addressed to the selective messaging unit on the wireless operating channel. Then, at preferably the selective messaging system, receiving a reconciliation message that originated at a local resource and corresponds to the identifier; and sending, responsive to the reconciliation message, a re-transmission of a portion of the message or previously undelivered message or message including additional information that is associated with the message corresponding to the identifier. The method further includes sending the message using the wireless operating channel or alternatively, using local resources for the transmission.

A corresponding apparatus embodiment of the present invention is a selective messaging unit arranged and constructed for operation in a wireless messaging system and for providing missing message reconciliation. The selective messaging unit comprises in combination a receiver for receiving messages originating from the wireless messaging system; a controller for processing the messages to provide an identifier, preferably message sequence number, corresponding to a missing message; and a local resource transceiver for transmitting a reconciliation message including the identifier to a message source such as a controller for the wireless messaging system. The local resource transceiver receives or alternatively the receiver receives, responsive to the reconciliation message, the missing message from the message source. A preferred form of the local resource transceiver is an infrared transceiver coupled by a further infrared transceiver to the message source utilizing an internet based pathway. Another embodiment of the local resource transceiver is a local area network transceiver coupled by a further local area network transceiver to the message source by the internet based pathway. An additional embodiment of the local resource transceiver is an optical transceiver utilizing a further optical transceiver and the internet based pathway for coupling the optical transceiver to the message source. The identifier preferably, further includes a content indication and the local resource transceiver conditions the transmitting of the reconciliation message on this content indication.

For a clearer understanding of the present disclosure the reader is referred to the FIG. 1 depiction of a representative paging or messaging system (100), preferably, a selective one-way messaging system, but alternatively a two-way messaging system, communicating with a selective messaging unit (135). The messaging system (100) includes a gateway or terminal (103), coupled to a source such as the public switched telephone network (101). The terminal (103) is available from Motorola as the WMGTM product as well as from other manufacturers. The terminal is coupled to, often collocated with, a system controller or controller (105), such as a Motorola RF CONDUCTOR™ suitably modified with the inventive principles discussed herein. For our discussion the system controller (105) is alternatively referred to as a message source (105) for missing message reconciliation activities. The terminal (103) and system controller (105), coupled together by switch port (102) operate together to communicate messages with destination addresses for the messaging unit (135) from the terminal (103) to the system controller (105) or various responses, in the case of a two-way system, back to the terminal (103), thus to the PSTN (101) and the originator.

The messaging system (100) includes, coupled to the controller (105), via a transmitter port (106), by the outbound network channel (107), a plurality of transmitters with five depicted as a first through 5th transmitter (111 . . . 115). The transmitters are available, for example, as Motorola NUCLEUS II™ transmitters or from other suppliers. The outbound network channel (107) is preferably leased telephone lines but may be any suitable media operating with any suitable networking or communication protocol including a radio or satellite link. It is understood that the FIG. 1 system is exemplary only and that much other equipment not here shown nor here relevant may be required in a practical system.

Additionally, the messaging system (100), if or when a two way system, includes, coupled to the system controller (105), via a receiver port (110), by a network channel (109), a plurality of base receivers, such as four depicted base receivers (117 . . . 120). Further the network channel (109) couples a plurality of local resources or nodes (one depicted at (147)) to the message source or system controller (105). The network channel is preferably leased telephone lines or any other suitable network link with the bandwidth necessary for the traffic expected on the channel. For both one way and two way paging or messaging, the network channel (109) is preferably implemented as an or in part as an internet based pathway coupling the local resource (147) to the message source (105). Typically at least some of the base receivers will be deployed at geographic locations different from the transmitters and typically more receivers and more local resources are deployed than transmitters. The local resources or nodes are deployed at locations with usually and preferably access to the internet or world wide web. Fortunately this is often inside buildings where messaging system coverage can be problematic.

Generally the messaging system is a scheduled system using a protocol such as the FLEX™ one-way or ReFLEX™ two-way protocols by Motorola where all messages outbound or inbound are transmitted within time slots in a time frame on an outbound or inbound channel (123, 129) each normally a different radio frequency. Typically within a given system all transmitters operate on the same outbound frequency or channel and often in a simulcast (nearly identical launchtime) mode. The system controller (105) is responsible for maintaining the schedule, designating what channel(s) if need be and respective transmitter(s) or radio frequency(ies) and when within the overall schedule for each channel, a message for a messaging unit will be transmitted, notifying messaging units of the time slot where they will receive messages and, if two way units, during what inbound time slot they are expected to acknowledge receipt of the message and what inbound slots are available for volitionally originated messages, according to a slotted ALOHA contention algorithm. The outbound messages are forwarded to the transmitters for subsequent transmission to the selective messaging unit, such as the depicted selective messaging unit (SMU) (135) in accordance with the system protocol at a particular time on the forward or outbound radio channels (123) serving as the wireless operating channel in the present invention.

The messaging unit (135) includes a local resource transceiver (141) that is arranged to interface as, for example, a local area or home network, with the local resource transceiver (147) part of the local resources (145), over a communications path (149), as further disclosed herein.

Ordinarily messages in a two way system originating at the messaging unit (135), either volitionally as in a message reconciliation request, or a registration request, as well as, response messages, such as an acknowledgment, are coupled by the reverse or inbound radio channel (129) to one or more of the base receivers where they are forwarded or relayed to the system controller (105) on the inbound or network channel (109). The present invention also allows or provides for the selective messaging unit, whether one or two way, to initiating messages destined or intended for the message source (105) by using the local resource transceiver as coupled through local resources (145). The local resource couples the message back to the receive port (110) of the controller, system controller, or message source (105) through preferably an internet based pathway. The local resource is, preferably, a computer (151), such as personal or desktop computer further having a local resource transceiver (147). The local resource (145) is coupled via a local communications path (149) to the local resource transceiver (141) of the selective messaging unit. These transceivers are, preferably, infrared, but alternatively optical, or local area network transceivers using generally known techniques. The protocols used to implement communications path (149) will reflect the type of transceivers (147, 141) used by the local resource and the SMU.

The infrared, local area network, or optical transceivers and corresponding inventive techniques allow the selective messaging unit to obtain paging or messaging coverage in locales, for example in building locations, where local resources (145) are present and coverage may not otherwise exist. The local resource transceivers disclosed herein allow, as further explained below, the selective messaging system to reconcile messages intended for the SMU that were initially delivered over a wireless operating channel.

Referring to the more detailed diagram of the system controller (105), the operation and basic structure of the controller will be explained. As above noted the controller, messaging system controller, or message source is adapted for scheduling messages over a wireless operating channel and further for cooperatively operating with a SMU to reconcile messages using local resources or network. The messages are intended for or addressed to and scheduled for a specific selective messaging unit. The messages contain an identifier, for example, a message sequence number. This message sequence number allows the selective messaging unit, and thus, the user to sequentially track the messages scheduled and transmitted by the controller. The messaging sequence number disclosed herein, allow as further explained below with reference to FIG. 5, the selective messaging system to identify and reconcile messages intended for the SMU that were or should have been received over the wireless operating channel or via local resources. By tracking the identifiers embedded in the received messages, the selective messaging unit decides that a message reconciliation is in order based on the perceived missing message or other criteria.

Other criteria may include reconciliation based or conditioned on a content indication. For example, a message with numerous errors but clearly a general broadcast news type of message may not need to be retransmitted. This content indication allows the selective messaging system and the selective message unit to complete reconciliation based on the content, relative priority (re-transmit only high priority messages), or other predetermined attributes of the message to be reconciled. The selective messaging unit sends a reconciliation message to the message source. As the message source (105), the controller or system controller is the destination of the reconciliation messages originated by the selective messaging unit via the local resource. Once the controller of the selective messaging system has received the reconciliation message, the controller, system controller, or messaging source (105), responsive to the reconciliation message, retrieves the corresponding message from memory and sends a re-transmission of the portion of the message or pending or related message with further related information, affiliated with the identifier based or conditioned, for example, on the message sequence number, content indication, or other predetermined criteria. The controller, system controller, or messaging source (105) will send the response to the reconciliation message request from the selective messaging unit utilizing the wireless operating channel or the local resources based on, preferably system preferences or attributes, or alternatively preferences designated with the selective messaging unit's reconciliation message request. The messaging system controller includes a processor (131) that is, preferably based on a 32 bit SuperSPARC microprocessor designed and distributed primarily by Sun Microelectronics. The processor (131) is coupled to the various input output ports, specifically switch, transmitter, and receiver ports (102, 106, 110) and further coupled to a memory (133). The memory is a combination of disk based and RAM based storage suitable for storing all operating software as well as database information required by the controller, system controller, or message source (105). In the exemplary diagram of FIG. 1 the controller is shown as a single entity. However it is understood that the controller and the terminal (103), either or both, may be composed of distributed terminal or distributed controller functions or resources and may be either collocated or located at a plurality of physical locations. This situation would likely be encountered in a large paging or messaging system such as the system in FIG. 1 that included some form of message reconciliation when the coverage area includes buildings, structures, or locations where coverage is less than desirable.

The local resource (145) in FIG. 1 comprising a personal or desktop computer (151) modified with the inventive principles disclosed herein has the capability to transmit and receive a signal utilizing the local resource transceiver (147). The specifics of this signal depend on whether the inventive principles are implemented using infrared, local area network, or optical technologies but will be low power short range signals. The signal identifies the availability of the local resource (145) or alternatively will recognize any or all selective messaging units appropriately equipped with a matching local resource transceiver (141). The local resource (145) communicates with selective messaging units within communication range that the local resource (145) can provide an internet based pathway to other communication nodes, having access to the world wide web or internet, such as the message source (105).

In the case of the present invention, the selective messaging unit by way of the local resource (145) is provided a path for message reconciliation requests or reconciliation messages including the message sequence number back to the message source (105). The network channel (109) is coupled to both the local resource (145) and the receive port (110) of the message source (105), utilizing or potentially utilizing an internet based pathway preferably implemented with leased telephone lines. The local resource also provides a primary or secondary communications path for the re-transmission of the portion of the message requested by the selective messaging unit. Based on the preference of the selective messaging system or unit and whether the SMU is able to receive signals from the selective messaging system on the normal wireless operating channel, the primary re-transmission path will use the local resource or alternatively the wireless operating channel. In the case of a two way selective messaging unit, a message reconciliation request can be fulfilled via the local resource (145) or via the inbound channel (129), if within range, and the network channel (109) back to the message source (105).

Figure 2:
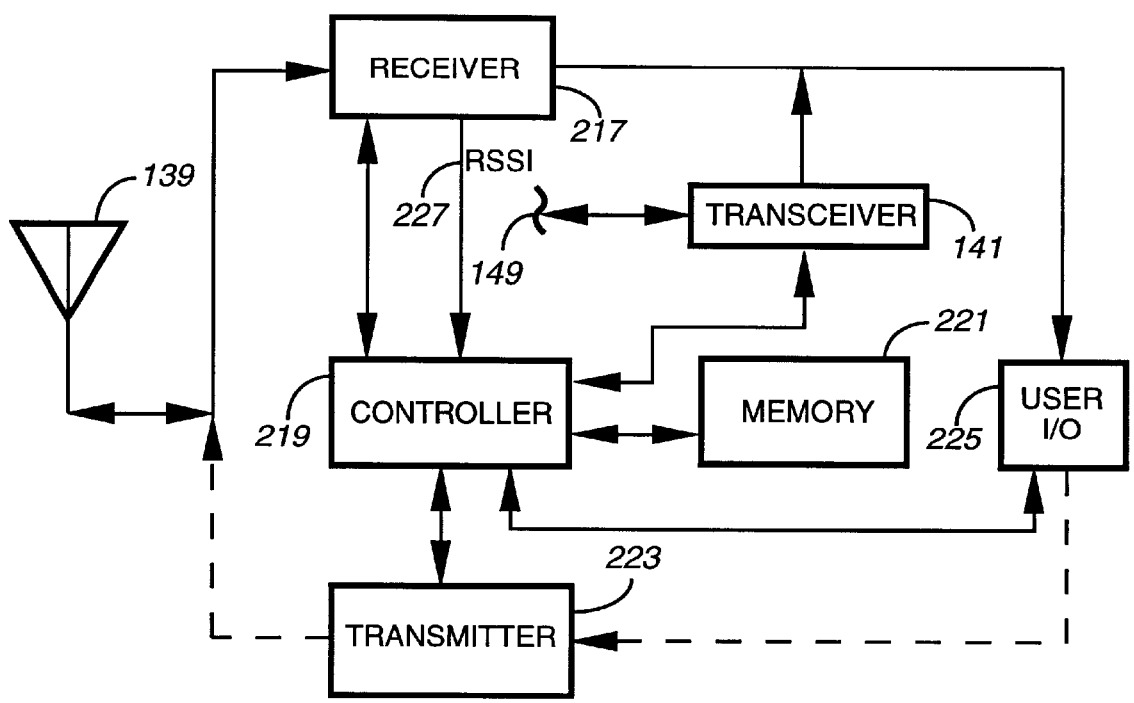
FIG. 2 is a block diagram of a preferred embodiment of a selective messaging unit including message reconciliation suitable for use in the FIG. 1 messaging system.

Continuing the present disclosure the reader is referred to the FIG. 2 block diagram of a selective messaging unit, such as unit (135) for the following discussion. Selective messaging units are available from Motorola and other suppliers and are commonly referred to as pagers. These readily available pagers would need to be modified in accordance with the principles disclosed herein. This modification will normally include a change in operating system software readily implemented by one skilled in the art in view of the principles herein together with the addition of a local resource transceiver, preferably infrared transceiver. FIG. 2 depicts a selective messaging unit arranged and constructed for message reconciliation. The unit includes an antenna (139), coupled to a receiver (217) and if a two way unit a transmitter (223). The antenna (139) operates to absorb radio signals and couple them to a receiver (217) or alternatively to radiate radio signals coupled to the antenna from the transmitter (223). The reader will appreciate that the transmitter is available or part of the selective messaging unit when the unit is a two-way messaging unit. The user I/O (225) is coupled to the receiver and, when present, the transmitter and preferably includes displays and pushbuttons, by which the selective messaging unit and the user interact. The user I/O allows or is operable to allow a user of the SMU to initiate a transmission by the local resource transceiver (141) that request further information associated with a message that has been received, In a sense this is messaging information on demand that saves the normal system capacity required to send lengthy messages or such messages that are of interest to only a subset of the population.

The receiver includes generally known elements such as filters, amplifiers, mixers, frequency generation units or synthesizers, demodulators, decoders, and the like and is coupled to and under the control of a controller (219). The controller programs the synthesizer thus tuning the receiver to and allowing it to operate to monitor the outbound channel and receive various messages on that channel. Once a message is decoded or partly decoded the receiver together with the controller can check the address of that message with the address of the selective messaging unit. If there is a match the message is intended for or addressed to this messaging unit. The receiver receives messages originating from the wireless messaging system under normal circumstances, or in response to a reconciliation request made by the selective messaging unit. The receiver (217) will forward information to the controller (219) regarding a Received Signal Strength Indicator (RSSI) (227) as messages are received to facilitate a determination of whether the selective messaging unit (SMU) is within coverage range of the selective messaging system.

Once the receiver (217) has received a message, and the controller (219) has processed the message with the included identifier, the SMU or controller will determine whether a reconciliation message is indicated. A reconciliation message is indicated if the SMU has received a message where a portion, such as a fragment, has numerous errors or where a portion is missing or not received due to such things as temporary lack of coverage or poor coverage. The SMU will identify missing messages or fragments as irregularities in the message sequence numbers, such as #1 and #3 present but #2 missing. A further indication would be an extended period without normal coverage. A further requirement for one way SMUs or two way SMUs without coverage is the availability of local resources. When the selective messaging unit is temporarily out of range due, for example, to its location in a building or structure that prevents the SMU from receiving messages on the wireless operating channel, and a local resource (145) is within range of the local resource transceiver (141) a reconciliation message including the last successfully received message sequence number can be forwarded to the message source using the local resource (145) and the internet based pathway. This will provide the message source (105) a secondary messaging path to the selective messaging units allowing any subsequemt messages to be forwarded. In cases where the aforementioned RSSI is below a predetermined level or a known message is perceived to be missing based on MSN, message reconciliation techniques further explained below can aid in the identification, reconciliation, and re-transmission of these messages.

The local resource transceiver (141) of the selective messaging unit (135) will detect the presence of a local resources (145) by its broadcast signal or by polling or as required in the relevant wireless local area network or home network. With the aid of the controller (219), the local resource transceivers (141) and the local resource (147) can sync or link up in order to initiate the message reconciliation process. Whether the transceivers both have infrared, local area network, or optical capability, once the transceivers (141, 147) have established communications, the SMU can transmit, to the message source, a reconciliation request including an identifier or MSN of the missing message or last successfully received message and indication of which.

When the SMU has the knowledge of the content or priority of the missed message, the SMU can decide whether to send, i.e. condition the transmittal of a reconciliation message on such knowledge. The controller (219) is arranged for or programmed to process messages to provide an identifier corresponding to missing or erroneous messages.

This identifier will include a content indication such as broadcast message, or priority indication when available. Message reconciliation requests by the selective messaging unit are, preferably, conditioned upon any reconciliation priorities, such as, the content indication or priority. It may not be economically practical to reconcile or re-transmit low priority or broadcast messages. Similarly it is not always practical to deliver extensive messages over the normal messaging channels. Thus the SMUs User I/O is arranged and operable to initiate transmissions from the local resource transceiver that request additional or further information, using the local resources, that is related or associated with messages already received. The controller (219), coupled to the transceiver (141), constructs reconciliation messages destined to the local resources (145). These reconciliation messages are forwarded via the transceiver (141) to the local resource (145) utilizing the communications path (149) implementing known infrared, local area network or optical techniques. From the local resource (145), the reconciliation message is forwarded to the receive port (110) of the message source (105) utilizing an internet based pathway (109).

The controller (219) of the SMU detects receipt of an appropriate response, preferably a re-transmission of a portion of the missing or erroneous message from the message source (105), determines that the reconciliation message operation is complete, and the selective messaging unit returns to receiving messages normally on the wireless operating channel if or when within coverage of the selective messaging system.

Further included in the selective messaging unit, coupled to the controller (319), is the memory (321) used for storing operating software and the relevant operating parameters such as message sequence numbers, the content indication, and the controls to enable the local resource transceiver.

Figure 3:
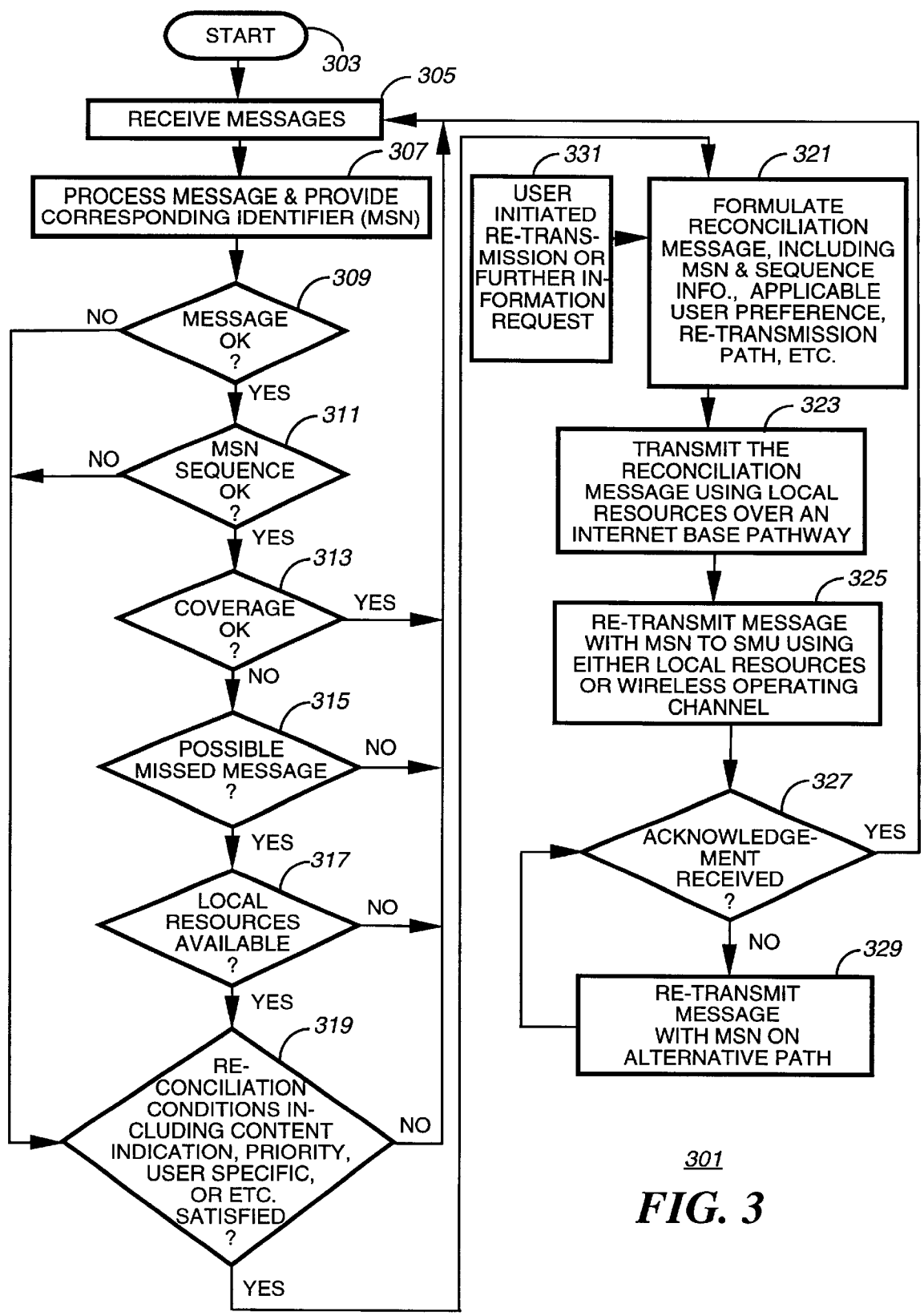
FIG. 3 is a flow chart of a preferred method embodiment in accordance with the present invention.

Referring to FIG. 3, a process or method of message reconciliation, preferably set in a selective messaging unit is depicted. The method begins or starts at (303) after which step (305) depicts receiving messages initiated, preferably by a wireless messaging system. Step (307) processes the message and provides an identifier, preferably a message sequence number, corresponding to the message prior to executing a series of tests in steps (309) through (319). A negative result in steps (309) or (311) sends the method to step (319) as discussed below. A negative result in steps (315), (317), or (319) returns the method back to receive messages in step (305). Step (309) verifies the message integrity (message O.K.?), and if the message is O.K., step (311) checks that the message sequencing number of the message received has the MSN expected based on a predetermined, preferably, sequential sequence. Assuming that the MSN sequence is O.K., step (313) tests whether the coverage is O.K.? and if so the process returns to step (305). If for example the RSSI is not sufficient the coverage will not be O.K., and operation goes to step (315). Step (315) analyzes or asks whether a possible missed message exists, and, if so, such as when a long time period has passed without coverage, the process moves ot step (317). Step (317) determines the availability of local resources. In the best mode of the present invention, the local resource transceiver of the local resource is equipped similarly to the local resource transceiver of the selective messaging unit. In the preferred form, both the local resource transceivers are infrared transceivers, yet alternatively local area network or optical transceivers can be used to embody the disclosed invention. If local resources exist, step (319) determines whether reconciliation conditions are satisfied (including for example content indication, priority, user specific, etc.). When the appropriate reconciliation conditions are satisfied, step (321) formulates a reconciliation message (including MSN and sequence information, applicable user preferences, re-transmission paths, etc.). The user of the selective messaging unit, preferably, has the ability in step (331) to initiate a re-transmission or further information request prior to executing step (321). This allows the user to request a retransmission of a message that for example was inadvertantly erased or to request additional information related to a message that the SMU has earlier received. Thereafter in step (323), a reconciliation message is transmitted from, preferably, the SMU using local resources over an internet based pathway. The method continues in step (325) where the message with the MSN is re-transmitted to the SMU using either local resources or the wireless operating channel. In step (327), the message source will look for an acknowledgment that the reconciliation request is received by the selective messaging unit, and when an acknowledgment is received, the SMU continues to receive messages normally at step (305). Where an acknowledgment is not received from the SMU, step (329) shows the selective messaging system re-transmitting the messages with the MSN on the alternative path until an acknowledgment is received. In practice, after one retransmitt attempt the SMU can return to normal operation at step (305).

Figure 4:
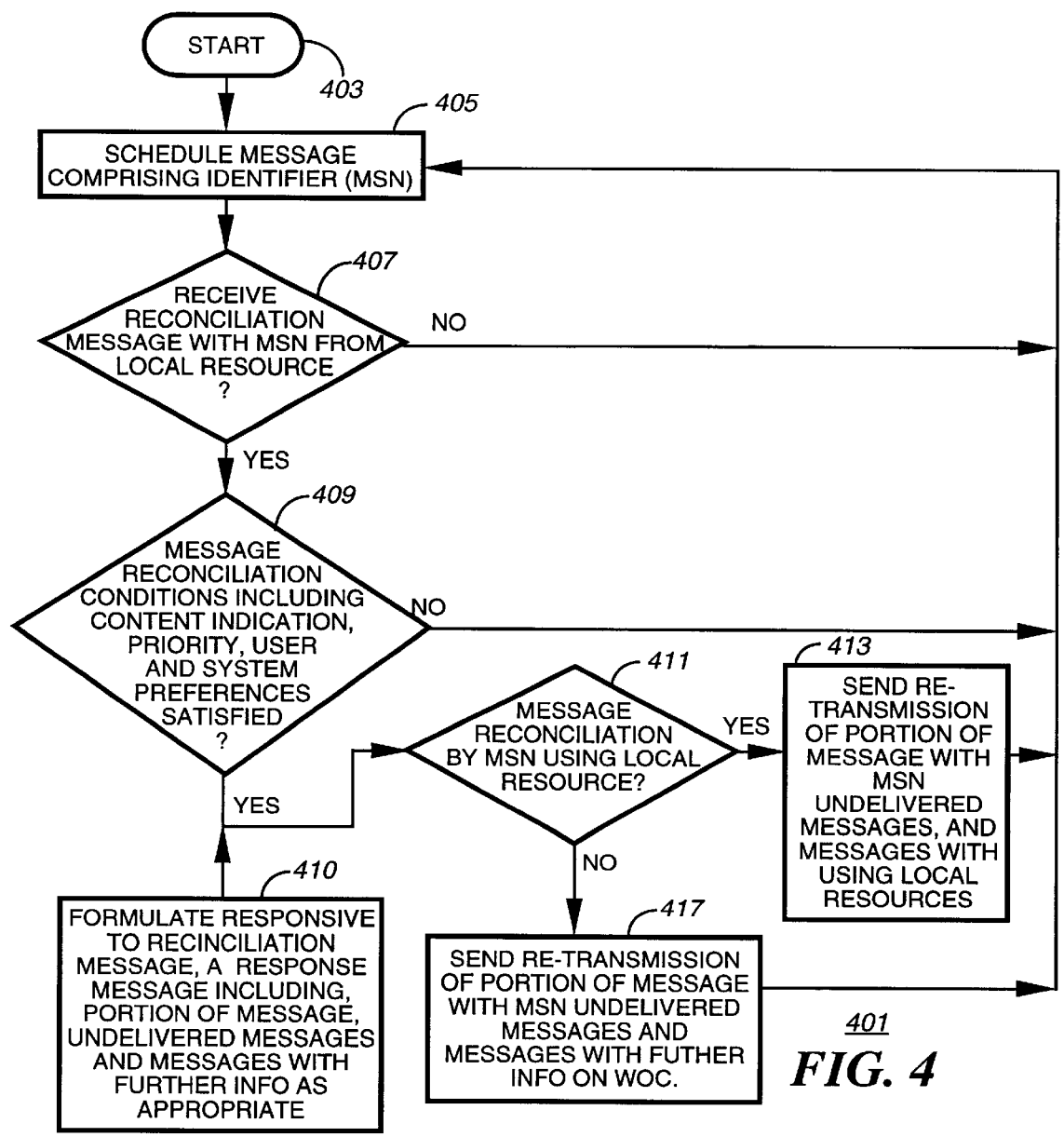
FIG. 4 is a flow chart of an alternative method embodiment in accordance with the present invention.

Referring to FIG. 4, an alternative process or method (401) set in a selective messaging system or infrastructure for reconciling messages on a wireless operating channel or local resource for a selective messaging unit is depicted. The method begins or starts at (403) after which, at step (405) a message is scheduled comprising an identifier preferably an MSN. In step (407) one verifies whether a reconciliation message is received with the corresponding MSN from the local resource. Until a reconciliation message is received with this MSN from the local resource, messages, comprising an identifier, will continue to be scheduled. When a reconciliation message or request is received from a local resource, step (409) determines whether any reconciliation conditions including for example, content indication, priority, and user and system preferences are satisfied. In the event message reconciliation conditions are not satisfied, the method returns to step (405). Otherwise the method proceeds to step (410) where, responsive to the reconciliation message a response message is formulated. This response message includes, as applicable under the circumstances, a portion of the message with the MSN, undelivered messages (messages with MSNs subsequent to or later than the MSN), messages with further information related to the MSN,. and etc. Thereafter, the method proceeds to step (411) asking whether message reconciliation by MSN should be fulfilled using the local resource. If reconciliation is to utilize local resources, step (413) sends a retransmission of the portion of the message with the MSN, undelivered messages, and messages with further information corresponding to the MSN using local resources and then continues to step (405). When the response to step (411) is negative, step (417) sends the re-transmission of the portion of the message with the MSN and so on, over or on the wireless operating channel before returning the method back to step (405).

Figure 5:
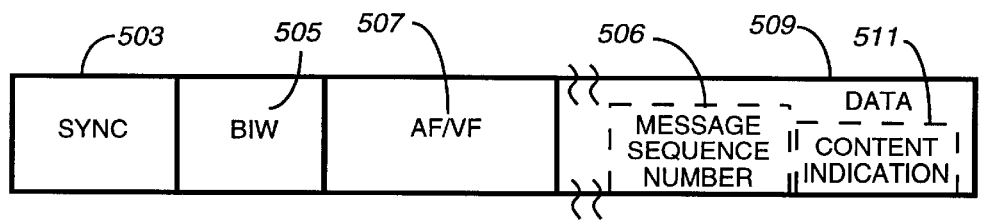
FIG. 5 is an exemplary protocol diagram.

When the system controller (105) sends messages to the selective messaging unit that effect missing message reconciliation, the message includes information depicted in the exemplary protocol diagram (501) shown in FIG. 5. The synchronization or sync (503) provides for synchronizing the incoming signal and the selective messaging unit and is well known. The data (509) portion of the message typically includes information intended to be conveyed to the user of the selective messaging unit. The Block Information Words or BIW (505) is used by the system controller (205) to inform the selective messaging unit of various system configuration parameters. The next field in the message is an address field (AF) and a vector field (VF) (507). This field will have an address that corresponds to a selective messaging unit and a corresponding vector that points to a location in the data or message field (509). At this location in the data field the identifier implemented as the message sequence number (506) or content indication (511) will, preferably, be found. This indication may take various forms as explained below. In the preferred form the message sequence number is an identifier sent by the controller of the selective messaging system to the selective messaging unit that allows the selective messaging unit to track the predetermined, usually sequential numbering scheme for messages. The content indication is an identifier that allow the selective messaging system or the selective messaging unit to further clarify reconciliation message requests based on predetermined criteria concerning message content such as message priority (High, Medium, Low), sorting multiple message reconciliation requests, etc.

When the subscriber requests message reconciliation based on a perceived missed message or other criteria, the selective message system can not only fulfill these requests on the wireless operating channels as known, but the selective messaging system can utilize local resources to provide an alternative path to provide paging or messaging services to the subscriber utilizing a selective messaging unit. The allows the service provider to expand the current coverage area without extensive build out of radio frequency resources. By providing an appropriately equipped node (145), representing a local resource, coupled to the internet or world wide web, a service provider can utilize the leased line infrastructure, and expand coverage in new geographic areas, or enhance coverage within building and structures that provide poor radio frequency coverage.

It will be appreciated by those of ordinary skill in the art that the apparatus and methods disclosed provide various inventive missing message reconciliation techniques such as local network or radio frequency reconciliation based on generally known Infrared, Local Area Network, or Optical transceivers. These inventive structures and methods may be readily and advantageously employed in a messaging system, selective messaging units, or other communications devices or systems so as to allow the user, as well as, the service provider options in providing message reconciliation capability. The best mode of message reconciliation preferably set in either a one way or two way selective messaging unit, relieve the user of the additional effort of monitoring the visual status indication to determine if messages have been missed and that message reconciliation is in order.

Hence, the present invention, in furtherance of satisfying a long-felt need of messaging systems, readily facilitates, for example, providing messaging capability to subscribers or users where coverage is less than optimal due to geographic or man made limitations. In these regions, the subscriber can remotely request message reconciliation without a phone call to the service provider, and the service provider expand coverage capability.

It will be apparent to those skilled in the art that the disclosed invention may be modified in numerous ways and may assume many embodiments other than the preferred forms specifically set out and described above. Accordingly, it is intended by the appended claims to cover all modifications of the invention which fall within the true spirit and scope of the invention.

What is claimed is:

1. A selective messaging unit arranged and constructed for operation in a wireless messaging system and for providing missing message reconciliation, the selective messaging unit comprising in combination:

a receiver for receiving messages originating from the wireless messaging system using a first wireless communication medium;

a controller for processing said messages to provide an identifier corresponding to a missing message; and a local resource transceiver, not including said receiver, for transmitting a reconciliation message including said identifier to a message source using a second, short-range wireless communication medium different from the first wireless communication medium.

2. The selective messaging unit of claim 1 wherein said controller processes said messages to provide said identifier corresponding to a message sequence number.

3. The selective messaging unit of claim 1 wherein said local resource transceiver receives said missing message from said message source.

4. The selective messaging unit of claim 1 wherein said receiver receives said missing message from said message source.

5. The selective messaging unit of claim 1 wherein said local resource transceiver is an infrared transceiver.

6. The selective messaging unit of claim 5 wherein said infrared transceiver is coupled to said message source by an internet based pathway.

7. The selective messaging unit of claim 1 wherein said local resource transceiver is a local area network transceiver.

8. The selective messaging unit of claim 7 wherein said local area network transceiver is an ISM band Home local area network transceiver.

9. The selective messaging unit of claim 7 wherein said local area network transceiver operates in a wireless local area network.

10. The selective messaging unit of claim 7 wherein said local area network transceiver is coupled to said message source by an internet based pathway.

11. The selective messaging unit of claim 1 wherein said local resource transceiver is an optical transceiver.

12. The selective messaging unit of claim 11 wherein said local area network transceiver is coupled to said message source by an internet based pathway.

13. The selective messaging unit of claim 1 wherein said identifier further includes a content indication for said missing message and said local resource transceiver conditions said transmitting said reconciliation message on said content indication.

14. The selective messaging unit of claim 1 further including user I/O operable to initiate a transmission by said local resource transceiver, said transmission requesting further information corresponding to said identifier.

15. In a selective messaging unit arranged to operate in a wireless messaging system, a method of message reconciliation, the method including the steps of:

receiving, by a receiver, using a first wireless communication medium, messages initiated by the wireless messaging system;

processing said messages to provide an identifier corresponding to a message; and transmitting, by a local resource transceiver, not including said receiver, using a second, short-range wireless communication medium different from the first wireless communication medium, a reconciliation message including said identifier to a message source.

16. The method of claim 15 wherein said step of transmitting further includes transmitting using an infrared transceiver.

17. The method of claim 16 wherein said step of transmitting further includes utilizing an internet based pathway for coupling said infrared transceiver to said message source.

18. The method of claim 15 wherein said step of transmitting further includes transmitting using a local area network transceiver.

19. The method of claim 18 wherein said step of transmitting further includes utilizing an internet based pathway for coupling said local area network transceiver to said message source.

20. The method of claim 15 wherein said step of transmitting further includes transmitting using an optical transceiver.

21. The method of claim 20 wherein said step of transmitting further includes utilizing an internet based pathway for coupling said optical transceiver to said message source.

22. The method of claim 15 wherein said step of transmitting further includes a step of providing a content indication corresponding to said message and conditioning said step of transmitting on said content indication.

23. The method of claim 15 further including a step of receiving, using said local resource transceiver, a response to said reconciliation message from said message source.

24. The method of claim 15 further including a step of receiving, using said receiver, a response to said reconciliation message from said message source.

25. The method of claim 15 further including a step of initiating by user I/O a transmission by said local resource transceiver, said transmission requesting further information corresponding to said identifier.

26. In a selective messaging system a method of reconciling messages delivered over a wireless operating channel for a selective messaging unit, the method including the steps of:

scheduling a message addressed to the selective messaging unit and to be sent using a first wireless communication medium on the wireless operating channel, said message including an identifier;

receiving, using a second, short-range wireless communication medium different from the first wireless communication medium, a reconciliation message corresponding to said identifier; and sending, responsive to said reconciliation message, a re-transmission of a portion of said message.

27. The method of claim 26 wherein said step of sending further includes using the first wireless communication medium for said re-transmission.

28. The method of claim 26 wherein said step of sending further includes using said second wireless communication medium for said re-transmission.

29. The method of claim 28 wherein said step of sending further includes sending a previously undelivered message.

30. The method of claim 28 wherein said step of sending further includes sending further information corresponding to said identifier.

31. The method of claim 26 wherein said step of scheduling said message includes scheduling a message sequence number.

32. The method of claim 26 wherein said step of sending is further conditioned on a content indication for said message.

* * * * *